United States Patent [19]

Hertell

[11] Patent Number: 4,462,302

[45] Date of Patent: Jul. 31, 1984

[54] MOTOR FUEL FEED PUMP

[75] Inventor: Siegfried Hertell, Radevormwald, Fed. Rep. of Germany

[73] Assignee: Barmag Barmer Maschinenfabrik Ag, Remscheid-Lennep, Fed. Rep. of Germany

[21] Appl. No.: 305,035

[22] Filed: Sep. 23, 1981

[30] Foreign Application Priority Data

Sep. 27, 1980 [DE] Fed. Rep. of Germany ... 8025955[U]
Nov. 12, 1980 [DE] Fed. Rep. of Germany ... 8030185[U]

[51] Int. Cl.[3] ...................... F04B 21/04; F16J 15/447; F16J 1/10

[52] U.S. Cl. ...................................... 92/248; 417/552

[58] Field of Search ........ 417/214, 470, 471, 552–554; 92/162, 168, 248, 249

[56] References Cited

U.S. PATENT DOCUMENTS

| | | | |
|---|---|---|---|
| 1,839,609 | 1/1932 | Spaeth | 417/552 |
| 2,064,750 | 12/1936 | Hurst | 417/214 |
| 2,429,426 | 10/1947 | Phillips et al. | 417/249 |
| 3,006,148 | 10/1961 | Hause | 417/214 |
| 3,236,190 | 2/1966 | Erickson | 417/468 |
| 3,655,296 | 4/1972 | McDoogall | 417/214 |
| 3,684,410 | 8/1972 | Fitzgerald | 417/554 |
| 3,703,125 | 11/1972 | Pauliukowis | 92/249 |
| 4,149,331 | 4/1979 | Davis | 417/267 |
| 4,273,516 | 1/1981 | Farr | 417/214 |
| 4,304,410 | 12/1981 | Erickson | 92/162 R |

FOREIGN PATENT DOCUMENTS

| | | | |
|---|---|---|---|
| 2844047 | 4/1980 | Fed. Rep. of Germany | 417/470 |
| 740582 | 11/1955 | United Kingdom | 417/552 |
| 1411978 | 10/1975 | United Kingdom | 417/554 |
| 2033537 | 5/1980 | United Kingdom | 92/248 |

*Primary Examiner*—William L. Freeh
*Attorney, Agent, or Firm*—John H. Shurtleff

[57] ABSTRACT

A motor fuel feed pump with a tappet operated piston or membrane wherein the tappet is linearly guided and sealed in a housing segment which projects into the cylinder chamber of the pump on its suction side or its pressure side with inlet and outlet means positioned such that the motor fuel flows around and in direct contact with the projecting housing segment.

9 Claims, 6 Drawing Figures

MOTOR FUEL FEED PUMP

BACKGROUND OF THE INVENTION

Motor fuel pumps in motor vehicles which serve to convey motor fuel, especially diesel fuel, between the tank and injection pump, are constructed as piston or membrane pumps in which a cylinder chamber is divided into a suction side and a pressure side by the piston or membrane having a tappet drive. In this construction, the tappet is driven in a straight line on a front end by an eccentric which lies outside of the pump. One problem with this arrangement resides in providing a reliable sealing of this straight line linkage. It is especially essential to prevent motor fuel from getting into the lubricating oil system. Also, the sealing must prevent the escape of motor fuel out of the pump since the fuel is inflammable at the hot motor block and in any event will cause environmental pollution problems. On the other hand, the sealing means are sensitive to heat so that a compromise between sealing effect, heat sensitivity and durability is necessary. The danger of a high heat load is very great due to the direct addition of the pump on the motor. Moreover, the hot motor oil is used for lubrication in the drive means of the pump.

SUMMARY OF THE INVENTION

According to the present invention, the heat effect is eliminated in that the tappet is sealed and guided in a straight line in a cylindrically shaped housing segment or so-called seal housing situated on the front side of the working cylinder, this housing segment extending or projecting into the working zone of the pump, i.e. either into the suction chamber or else into the pressure chamber in such a manner that the housing segment is placed in contact with the flow of the motor fuel. Since the motor fuel and especially the fresh fuel being conducted from the tank is not heated, this arrangement produces such an intensive cooling of the sealing means and straight linkage mechanism, that both the mounting problems leading to thermal effects as well as to a poor volumetric efficiency and also the sealing and durability problems are solved. For reducing the frictional heat, the piston is made to fit with distinct play in the cylinder, and preferably has circumferential grooves as a labyrinth-like sealing means.

It is known that motor fuel foams easily. In order to reduce the foaming in the pump and thereby increase its efficiency, the suction valve can be inclined with respect to the conduit or tubular path of the inlet and can be arranged to favorably direct the stream of fuel toward the piston.

THE DRAWINGS

Preferred embodiments of the invention are described as follows with the aid of the FIGS. 1–6 wherein.

DESCRIPTION OF THE PREFERRED EMBODIMENTS

Figure 1:
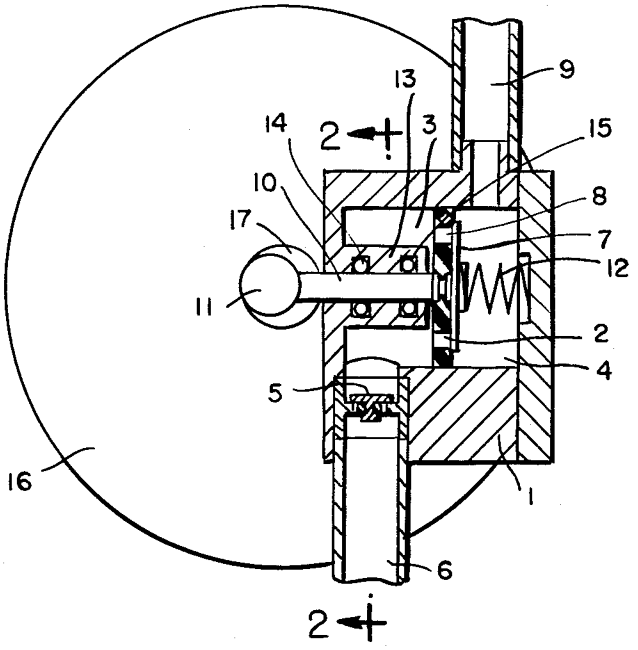
FIG. 1 is an axial cross section of one embodiment of the motor fuel pump according to the invention.

The motor fuel pump consists of the cylinder 1 and the piston 2 which partitions the working zone of the cylinder into a suction chamber 3 and a pressure chamber 4. The fuel inlet 6 is closed by the suction valve or inlet valve 5. The outlet valve 7, e.g. a flutter type sealing disc, is seated on the outlet 8 which is designed as a bore in the piston 2. The outlet channel is designated with the numeral 9.

The piston is driven by the tappet 10 which mates with the eccentric 11. The eccentric sits on the shaft 17 of a low pressure pump or vacuum pump 16, the function and working manner of which is later described. By means of the eccentric 11 and tappet 10, the power stroke is transmitted to the piston 2, whereby simultaneously the motor fuel is sucked into the suction chamber 3 and fuel is conveyed from the pressure chamber 4 over outlet 9. The back stroke of the piston 2 is effected by the operating spring 12. As will be understood, the piston 2 can be replaced by a membrane since both are equivalent mechanical elements.

The tappet 10 is directed in a straight line in the seal housing 13. The seal housing 13 is arranged on a front face of the cylinder 1 and projects into the suction chamber 3 in the illustrated embodiment. With a corresponding reversal of the working method, the seal housing can also be inserted, however, into the pressure chamber 4. In this manner the efficiency of the pump can be improved.

The sealing rings 14 and 15 serve as the sealing means.

The advantage of the invention resides in the fact that the sealing rings can be produced from a commercial and relatively inexpensive material and need to lie on the sealing surfaces with only slight pressure, since the seals undergo no heat stresses and therefore are not subject to any thermal expansion.

Figure 2:
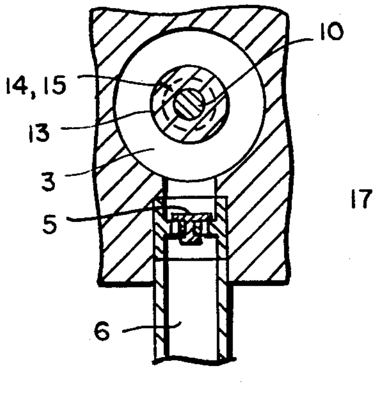
FIG. 2 is a fragmentary cross section through the seal housing and feed pipe of the motor fuel pump.

FIG. 2 gives a cross section through the motor fuel feed pump on line 2—2 of FIG. 1, the same reference numerals being used as in FIG. 1.

Figure 3:
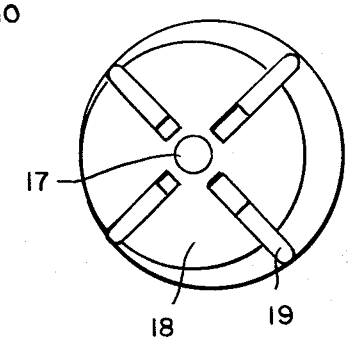
FIG. 3 is a diagrammatic illustration of the vacuum pump, the drive shaft of which effects the tappet drive.

FIG. 3 is a diagrammatic sketch of the vacuum pump 16, the motor fuel feed pump being flange-mounted on its front face. On the shaft 17 of vacuum pump 16, driven by the engine of the motor vehicle, the rotor 18 is seated eccentrically in the housing. The rotor 18 has axial slots in which the vanes 19 are movable. Rotor 18, vanes 19 and housing define crescent-shaped zones of different pressure. These types of pumps are known and commonly used in motor vehicles, especially in diesel powered motor vehicles, in order to produce a vacuum for amplifying the braking force of power brakes. For a detailed description of such vacuum pumps, reference is made to the German patent specification (DE-OS) No. 2,617,514.

Figure 4:
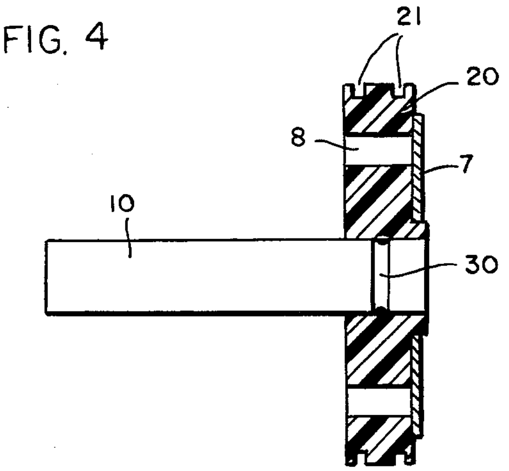
FIG. 4 is a longitudinal section of a favorable design of the piston and the piston rod of the pump.

In the longitudinal section shown in FIG. 4, a preferred design of a piston 20 of the fuel pump has circumferential grooves 21 which provide a labyrinth-like sealing means when the piston is moved back and forth in the housing cylinder in which it fits with a distinct play. The piston 20 consists of a glass fiber reinforced plastic having superior characteristics relating to its stability as to shape or geometric form and also relating to its low coefficient of thermal expansion. For instance the plastic material may be a moldable thermosetting polymer or a heat stabilized thermoplastic polymer, e.g. from the class of well-known polyamides. As a reinforcing means, other known filling and reinforcing materials, e.g. carbon fibers, asbestos fibers and mineral powders can be used in place of the glass fibers. The steel or plastic tappet 10 is rigidly connected at groove 30 with piston 20 by laying the tappet 10 into the mold when the piston 20 is injection molded, the polymer flowing into groove 30 to form an annular rabbet. A unitary piston and tappet may also be molded from the same plastic material.

Figure 5:
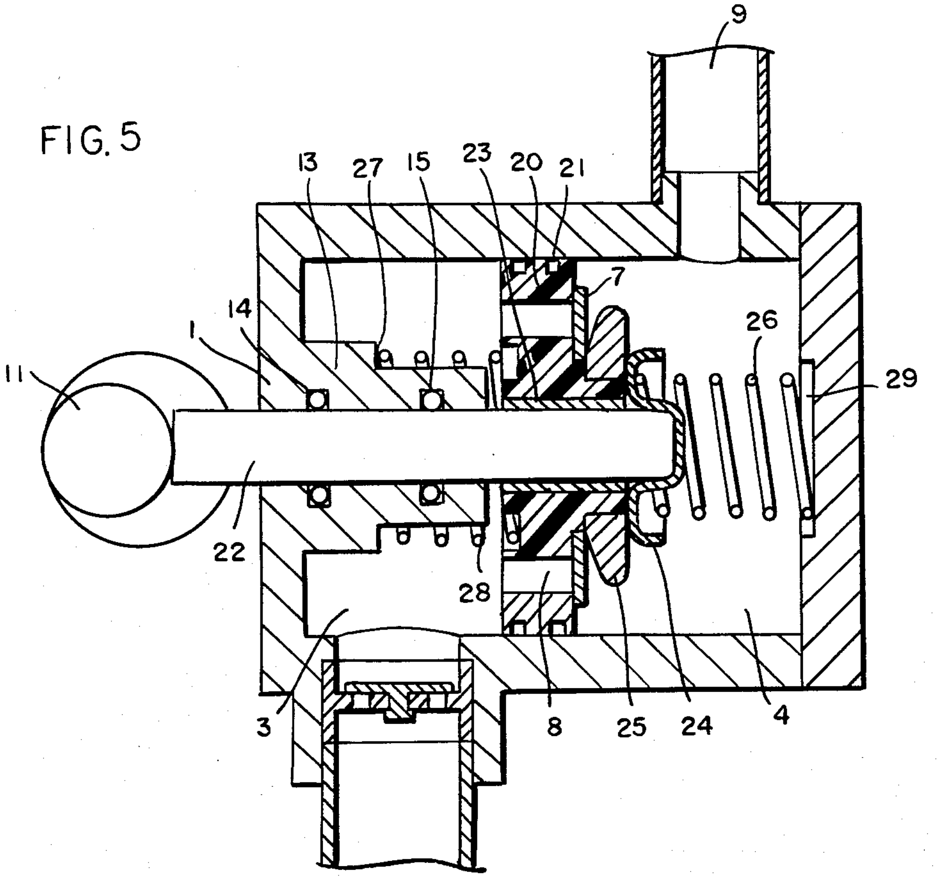
FIG. 5 is a diagrammatic view of a special design of a pressure controlled pump.

FIG. 5 shows an alternative design of a pressure controlled pump according the the invention. The characteristic feature of this pump design is that the tappet 22 is movable loosely inside piston 20 which is molded from a plastic and which has an inner metal bushing 23 for guiding or directing the tappet 22 in a straight line along the cylinder 1 in the pump housing. The tappet 22 is covered by a cap 24 adjacent to a ring 25 which clamps the outlet valve means 7 and covers the outlet holes 8 of piston 20. Between cap 24 and the outlet end of the pump housing having a centering recess 29, there is inserted the compression spring 26 bearing upon one face of the tappet 22, while between the other end of piston 20 and a supporting base or centering shoulder 27 at the inlet end of the housing, especially of the sealing housing 13 for the tappet 22, another compression spring 28 is inserted for moving the piston 20 together with bushing 23 and tappet 22 while tappet 22 is moved inwardly or forwardly to its top dead center. The first spring 26 has substantially the same function as spring 12 in FIG. 1. The second spring 28 acts to reduce the stroke movement of piston 20 depending upon the liquid pressure in chamber 4. If the liquid pressure at the outlet end of the pump rises above a predetermined maximum pressure, e.g. 1.8 bar absolute pressure, such liquid pressure will hold piston 20 back in its bottom or rear dead position between spring means 26 and 28 and only tappet 22 will slide back and forth along bushing 23 and convey just a small amount of fuel by the action of driven tappet 22. When the outlet pressure falls, compression spring 28 again will exert a force to move piston 20 together with tappet 22 for suctioning fuel from the inlet 6 of the pump.

Figure 6:
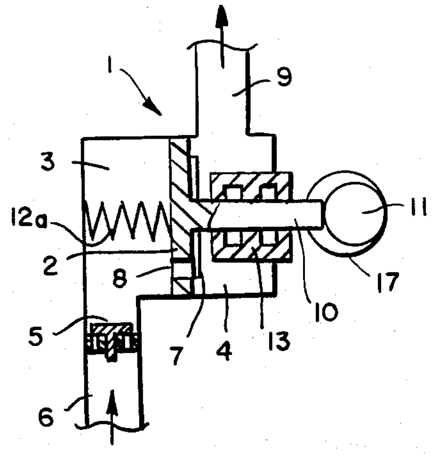
FIG. 6 is a diagrammatic view of another preferred embodiment of the invention in which the seal housing projects into the pressure chamber rather than the suction chamber of the feed pump.

FIG. 6 is a simple schematic view of a motor fuel pump similar to that of FIG. 1 except that the tappet 10 and its seal housing 13 operated by eccentric 11 are on the opposite side of the fuel pump, and a spring 12*a* similar to spring 12 in FIG. 1 should be positioned to act on the piston 2 providing its back stroke. Spring 12*b* is optional and can be omitted. Also the bore 8 in piston 2 can be located beneath the housing 13 to ensure a steady flow of fuel around housing 13 in the pressure chamber 4. This alternative structure may otherwise incorporate all of the structure of FIG. 1 or the various disclosed modifications of FIGS. 2–5.

The invention is hereby claimed as follows:

1. A motor fuel feed pump with a cylinder chamber divided into a pressure side and a suction side by a piston or membrane and operated by a tappet drive wherein the tappet is linearly guided and sealed in a housing segment which projects into the cylinder chamber of the pump on its suction side or on its pressure side in such a way that the motor fuel flows around the projecting housing segment, said tappet consisting of steel and said piston consisting of a plastic material which is stable in form and has a low coefficient of thermal expansion sufficient to meet the operating characteristics of the pump, the piston being slidably mounted with respect to the tappet by means of an inner metal bushing.

2. Motor fuel feed pump according to claim 1 wherein the piston has a distinct play in the cylinder and has circumferential grooves as a labyrinth-like sealing means.

3. Motor fuel feed pump according to claim 1 wherein the seal housing projects into the suction side of said cylinder chamber.

4. Motor fuel feed pump according to claim 1 wherein the piston is made from a glass fiber reinforced plastic material.

5. Motor fuel feed pump according to claim 4 wherein the plastic material is selected from the group consisting of thermosetting plastics or a heat stabilized polyamide.

6. Motor fuel feed pump according to claim 4 or 5 wherein the piston is slidably mounted on the tappet with an inner metal bushing interposed therebetween and wherein an energizing means bears upon both of the facing surfaces of the piston.

7. Motor fuel feed pump according to claim 1 wherein the piston is slidably mounted on the tappet with an inner metal bushing interposed therebetween and further including two spring means as energizing means which bear upon both of the facing surfaces of the piston.

8. Motor fuel feed pump according to claim 7 comprising a first spring means clamped between the facing surface of the piston and a supporting base arranged inside the housing of the pump at the inlet end a second spring means supported between the top end of the tappet and a supporting base at the outlet end of the pump housing.

9. Motor fuel feed pump according to claim 8 wherein said spring means are designed such that the second spring means, which is clamped between the piston and a supporting base at the outlet end of the pump housing and which acts on the face of the tappet, exerts a spring force high enough to compress the first spring means mounted between the piston and the inlet end of the pump housing, while the tappet is moved back to its bottom dead center by the eccentric.

* * * * *